United States Patent

Emori et al.

[11] Patent Number: 4,793,433
[45] Date of Patent: Dec. 27, 1988

[54] HYDRAULIC REACTION FORCE APPARATUS FOR POWER STEERING SYSTEM

[75] Inventors: Yasuyoshi Emori; Hirotetsu Sonoda, both of Higashimatsuyama, Japan

[73] Assignee: Jidosha Kiki Co., Ltd., Tokyo, Japan

[21] Appl. No.: 74,798

[22] Filed: Jul. 17, 1987

[51] Int. Cl.[4] ............................................. B62D 5/083
[52] U.S. Cl. ................................. 180/143; 91/375 A; 137/625.24; 180/132; 180/142; 180/148; 277/58; 277/165; 277/174; 277/176; 277/177
[58] Field of Search ............... 180/143, 141, 142, 148, 180/132; 251/297; 91/375 A, 375 R; 137/625.21, 625.24; 277/165, 174, 176, 177, 172, 58, 63

[56] References Cited

U.S. PATENT DOCUMENTS

| | | | |
|---|---|---|---|
| 4,034,825 | 7/1977 | Adams | 180/143 |
| 4,275,641 | 6/1981 | Kopp | 277/165 X |
| 4,380,273 | 4/1983 | Walter | 180/132 |
| 4,632,204 | 12/1986 | Honaga et al. | 180/143 X |
| 4,653,339 | 3/1987 | Komatsu et al. | 180/148 X |

FOREIGN PATENT DOCUMENTS

| | | |
|---|---|---|
| 49-102092 | 9/1974 | Japan . |
| 52-39530 | 10/1977 | Japan . |
| 59-230863 | 12/1984 | Japan . |
| 60-226368 | 11/1985 | Japan . |
| 61-98671 | 5/1986 | Japan . |
| 819787 | 9/1959 | United Kingdom ................ 180/148 |

Primary Examiner—David M. Mitchell
Assistant Examiner—Mitchell J. Hill
Attorney, Agent, or Firm—Townsend and Townsend

[57] ABSTRACT

A hydraulic reaction force apparatus for a power steering system includes input and output shafts, guide holes, balls, a reaction force reception portion, a hydraulic reaction force chamber, and a reaction force piston. The output shaft is coaxial with the input shaft, the output shaft and the input shaft being rotatable relative to each other. The guide holes axially extend through a flange formed on one of the input and output shafts. The balls are axially slidable in the guide holes, respectively. The reaction force reception portion is formed on the other one of the input and output shafts so as to oppose one major surface of the flange. The reaction force reception portion is adapted to receive the balls. The hydraulic reaction force chamber is formed on the other major surface of the flange which opposes its one major surface. The reaction force piston is slidably coaxial with the input and output shafts in the hydraulic reaction force chamber. The reaction force piston is adapted to urge the balls against the reaction force reception portion to generate a restriction force corresponding to a reaction force hydraulic pressure between the input and output shafts.

8 Claims, 3 Drawing Sheets

HYDRAULIC REACTION FORCE APPARATUS FOR POWER STEERING SYSTEM

BACKGROUND OF THE INVENTION

The present invention relates to an improved hydraulic reaction force apparatus for a power steering system and, more particularly, to a hydraulic reaction force apparatus for producing an appropriate steering force according to vehicle traveling conditions such as a vehicle speed and a steering angle.

In a conventional power steering system for reducing a steering wheel turning force (steering force) in a vehicle, the system must be appropriately controlled according to various vehicle traveling conditions such as a steering force and a steering angle, which are associated with steering operations by a driver, as well as a vehicle speed. In steering during a stationary swing or traveling at a low speed, a large auxiliary steering force is output to allow steering with a small force. However, in traveling at a high speed, generation of a large auxiliary steering force causes the driver to feel anxiety, which is undesirable to optimize driving feelings. In traveling at a high speed, the auxiliary steering force must be small to increase a force required for steering by the driver. The driver then feels steering heavy to a proper extent and thus stability for straight driving is assured. The above steering force control is also required when the steering angle is increased.

In order to satisfy the above needs, a hydraulic reaction force apparatus is known as an apparatus for giving a proper resistance (i.e., a steering reaction force) to the steering wheel by a hydraulic force controlled by various vehicle traveling conditions at high and low speeds. There are proposed various types of hydraulic reaction force apparatuses. A typical example of the hydraulic reaction force apparatus is described in Japanese Patent Laid-Open No. Application 49102092. A reaction force arm extends from a flow path selection rotary control valve on the input shaft side. A pair of reaction force plungers extend/contract on the arm from both sides of the arm on the output shaft side along the rotational direction. A hydraulic reaction force chamber is formed on the side of the outer ends of the plungers. A reaction force hydraulic pressure is properly supplied to the hydraulic reaction force chamber according to a vehicle speed or the like to drive the plungers. A predetermined restriction force acts on the input shaft through the arm, thereby obtaining the proper steering reaction force and hence allowing steering operations corresponding to the traveling conditions.

However, in the conventional structure, the reaction force plungers must be disposed at an output shaft portion spaced apart from the axis. Therefore, the radial size of the reaction force apparatus is inevitably increased. This typically occurs when the pressure-receiving area of the plunger is increased and the hydraulic reaction force capacity is accordingly increased. A power steering apparatus provided with the reaction force apparatus of this type is disposed in a limited space such as a lower portion of the engine room of the vehicle. Therefore, compactness is one of the factors to be overcome.

A conventional compact reaction force apparatus of this type is disclosed in U.S. Pat. No. 4,034,825. Engaging members such as reaction force plungers and balls are supported on the output shaft side and are movable toward the center of the output shaft. The engaging members are fitted in engaging recesses formed in the input shaft, thereby producing a restriction force.

In the conventional reaction force apparatus described above, if the engaging member is a plunger, the distal end of the plunger is brought into sliding contact with the engaging recess. When a hydraulic reaction force is generated, a large sliding resistance is produced between the engaging recess and the distal end of the plunger. Therefore, a frictional force is increased to cause operational instability of the reaction force apparatus. Furthermore, if the pressure-receiving area of the plunger is increased, the radial size of the reaction force apparatus mounting portion is increased to fail to achieve compactness, and the plunger diameter is increased. The length of the guide for guiding the plunger becomes insufficient and a stable operating state cannot be obtained.

If the engaging member comprises a ball, it is difficult to assure oil tightness between the ball and the guide hole. The amount of hydraulic reaction force leakage is increased. Generation of an effective hydraulic reaction force requires a hydraulic source having a high flow rate, thus resulting in an impractical structure. Therefore, a demand has arisen for developing a hydraulic reaction force apparatus which has compactness and operational stability.

SUMMARY OF THE INVENTION

It is, therefore, a principal object of the present invention to provide a reaction force apparatus which has compactness in the radial direction.

It is another object of the present invention to provide a reaction force apparatus capable of producing a large reaction force torque by using a small hydraulic reaction force.

In order to achieve the above objects of the present invention, there is provided a hydraulic reaction force apparatus for a power steering system, comprising: an input shaft; an output shaft coaxial with the input shaft, the output shaft and the input shaft being rotatable relative to each other; guide holes axially extending through a flange formed on one of the input and output shafts; balls axially slidable in the guide holes, respectively; a reaction force reception portion formed on the other one of the input and output shafts so as to oppose one major surface of the flange, the reaction force reception portion being adapted to receive the balls; a hydraulic reaction force chamber formed on the other major surface of the flange which opposes the one major surface thereof; and a reaction force piston slidably coaxial with the input and output shafts in the hydraulic reaction force chamber, the reaction force piston being adapted to urge the balls against the reaction force reception portion to generate a restriction force corresponding to a reaction force hydraulic pressure between the input and output shafts.

DESCRIPTION OF THE PREFERRED EMBODIMENTS

Figure 1:
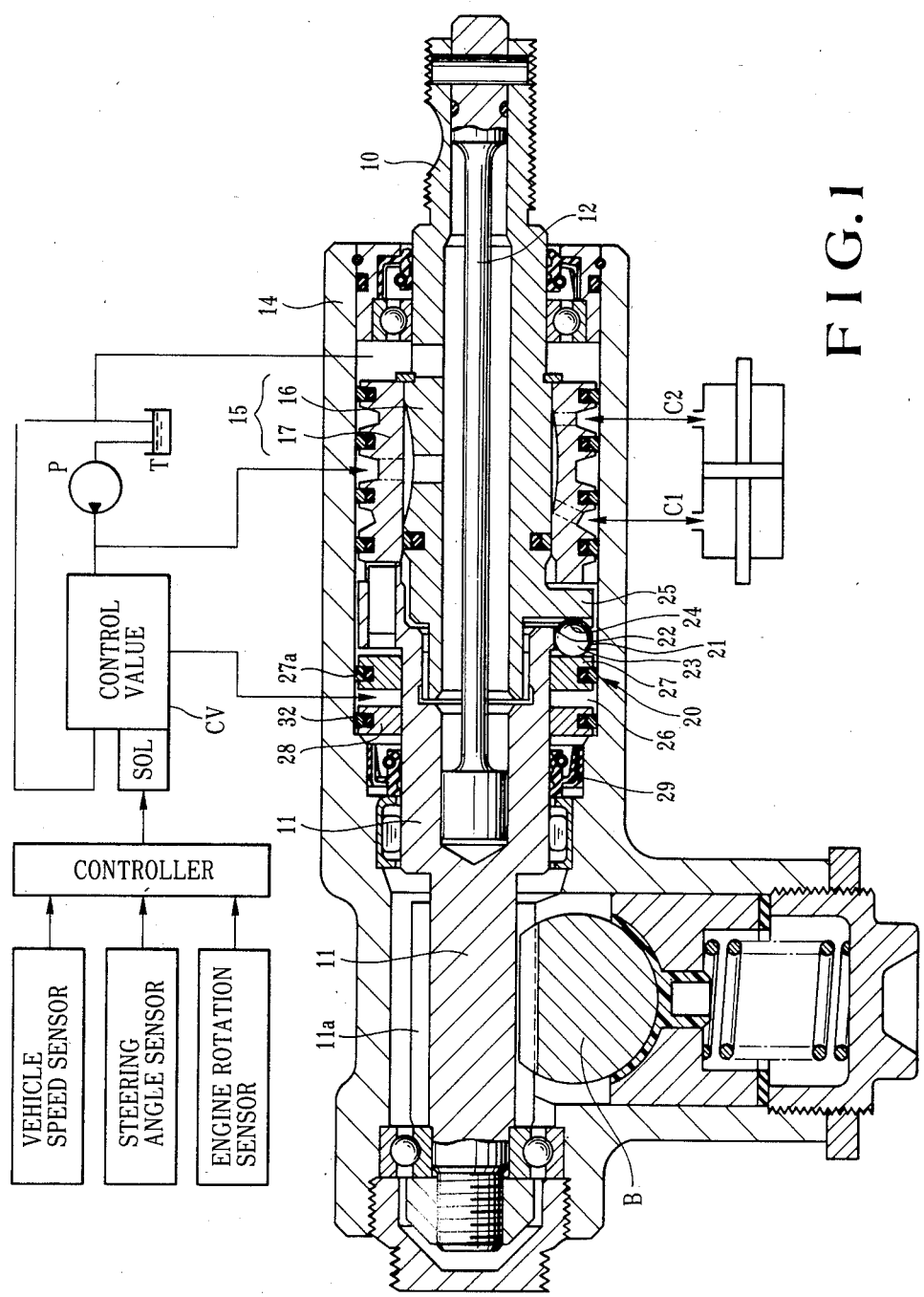
FIG. 1 is a sectional view of a hydraulic reaction force apparatus for a power steering system according to an embodiment of the present invention.
Figures 2A, 2B:
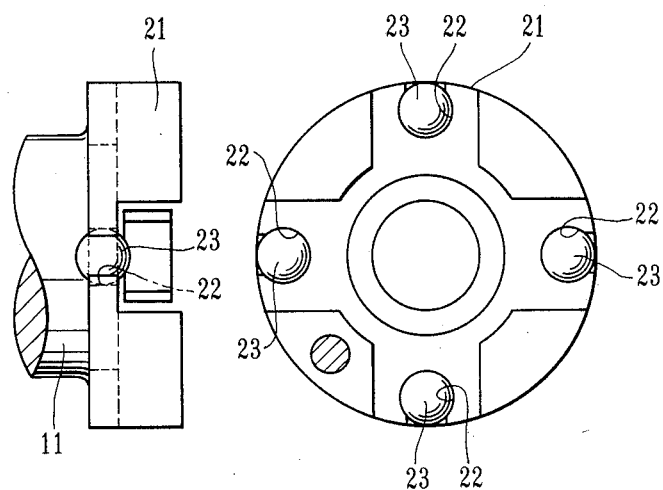
FIGS. 2A and 2B are respectively a schematic side view and an end view, both of which show a ball engaging state of an output shaft flange.
Figures 3A, 3B:
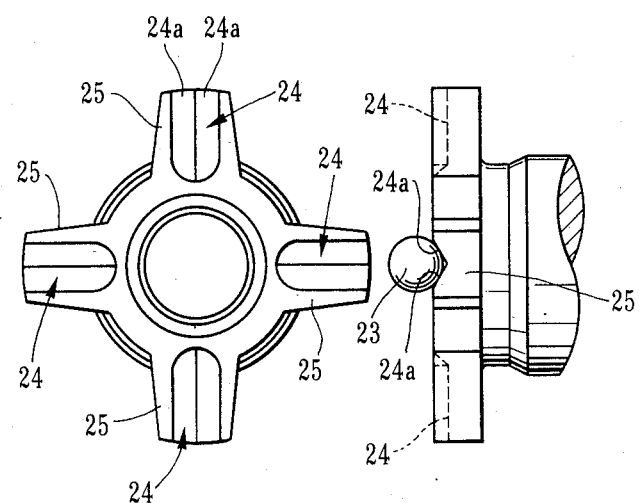
FIGS. 3A and 3B are respectively a schematic end view and a side view, both of which show a ball engaging state of an input shaft reaction force reception portion.

The present invention will be described in detail with reference to the accompanying drawings.

FIGS. 1 to 3B show a hydraulic reaction force apparatus for a power steering system according to an embodiment of the present invention. The overall structure of a power steering unit in the power steering system will be described with reference to FIG. 1. Reference numeral 10 denotes an input shaft (stub shaft) coupled to a steering wheel (not shown); and 11, an output shaft (pinion shaft) couple to the left end of the input shaft 10 through a torsion bar 12 and having a pinion 11a meshed with a rack B constituting a steering link mechanism (not shown). The shafts 10 and 11 are properly rotated in tee steering direction. A fail-safe mechanism is arranged between the input and output shafts 10 and 11 and is pivoted by a predetermined angle or more and brought into contact with the shafts 10 and 11, thereby coupling the shafts 10 and 11.

A rotor 16 and a sleeve 17 which constitute a rotary flow path selector 15 are integrally mounted on the shafts 10 and 11 in a body 14 constituting the power steering unit. The flow paths between an oil pump P, an oil tank T, and left and right cylinder chambers C1 and C2 are selectively switched by relative angular positions of the rotor 16. Since the structure and operation of the rotary flow path selector 15 are known to those skilled in the art, a detailed description thereof will be omitted.

Reference numeral 20 denotes a hydraulic reaction force apparatus which is the characteristic feature of the present invention. The hydraulic reaction force apparatus 20 is arranged between the input and output shafts 10 and 11 integral with the rotor 16 and the sleeve 17, the latter two of which constitute the flow path selector 15. As is apparent from FIGS. 1 to 3B, the hydraulic reaction force apparatus 20 comprises: guide holes 22 axially extending through a flange 21 formed on the output shaft 11; balls 23 respectively supported to be slidable in the guide holes 22 in the axial direction; a reaction force reception portion 25 with V-shaped radial engaging recesses 24 having inclined surfaces 24a at both sides adapted to respectively engage with the balls, the reaction force reception portion 25 being mounted on the input shaft 10 to oppose one major surface of the flange 21; a hydraulic reaction force chamber 26 arranged on the other major surface side of the flange 21; and a ring-like reaction force piston 27, coaxial with the input and output shafts 10 and 11 and slidable in the hydraulic reaction force chamber 26, for urging the balls 23 to respectively engage with the engaging recesses 24 in the reaction force reception portion 25 to apply a restriction force between the input and output shafts 10 and 11 in accordance with the hydraulic reaction force. In this embodiment, four guide holes 22 are formed through the flange 21 formed on the output shaft 11 and four balls 23 are respectively held in the four guide holes 22. In this case, four engaging recesses 24 are formed on the input shaft 10. As is apparent from FIGS. 2A and 2B, recesses are formed in the peripheral portion of the flange 21 around the guide holes 22. This is to minimize the diameter of the flange 21. Reference numeral 28 in FIG. 1 denotes a seal member fitted on the outer surface of the output shaft 11 with a small oil-tight clearance so as to seal the other end of the hydraulic reaction force chamber 26. A seal ring 32 is mounted on the outer circumferential surface of the seal member 28 to seal the space between the seal member 28 and the body 14. However, the seal member 28 may be omitted. In this case, the other end of the chamber 26 may be sealed with an oil seal member, as indicated by reference numeral 29. In addition, a set spring or the like may be additionally disposed in the hydraulic reaction force chamber 26 to bias the hydraulic reaction force piston 27 toward the balls 23 and prevent unnecessary movement of the balls 23.

With the above structure, since the left end portion of the ring-like reaction force piston 27 axially moved in the body 14 serves as a pressure-receiving surface facing the hydraulic reaction force chamber 26, the pressure-receiving area in the minimum space in the radial direction can be increased as compared with the conventional structure. Therefore, a compact structure of a portion including the hydraulic reaction force apparatus 20 can be achieved. In addition, the size of a hydraulic source for producing a predetermined hydraulic reaction force can be advantageously reduced.

According to this embodiment, signals from a vehicle speed sensor, a steering angle sensor, an engine rotation sensor, and the like are sent to a controller. The controller controls a control valve CV in accordance with control signals derived from the sensor outputs. A proper hydraulic pressure is applied through the control valve in accordance with various traveling conditions such as a vehicle speed and acts on the balls 23 held in the guide holes 22 in the output shaft 11 at the right end portion of the reaction force piston 27 axially moved to the right. Therefore, the balls 23 are urged in the axial direction so that the balls 23 can be respectively fitted in the engaging recesses 24 of the reaction force reception portion 25 on the input shaft 10, thereby producing a predetermined restriction force by the hydraulic reaction force. The relative rotation between the input and output shafts 10 and 11 is properly restricted, and a necessary steering reaction force can be obtained to achieve proper steering force control. In the above-mentioned steering control, when the input shaft 10 is rotated, each ball 23 is rolled on one (24a) of the inclined surfaces 24a of the corresponding engaging recess 24 and is axially displaced by an inclination amount. In this case, a reaction force derived by urging the reaction force piston 27 serves as a steering reaction force which is thus transmitted to the input shaft 10.

In this state, with the above structure, the balls 23 are brought into rolling contact with the guide holes 22, the inclined surfaces 24a of the engaging recesses 24, and the end face of the piston 27. A sliding resistance or the like is small, and a frictional force is rarely generated. An increase in sliding resistance in the rotational direction, which is undesirably caused by a seal ring, can be canceled. Therefore, smooth operation of the flow path selector 15 and smooth rotation of the steering wheel can be advantageously achieved.

The reaction force piston 27 is slidably guided and supported along the axial direction while a small oil-tight clearance is kept on the outer surface of the output shaft 11. A seal ring 27a is disposed between the piston 27 and the body 14. However, the inner and outer circumferential seal structures may be reversed. Alternatively, the inner and outer circumferential seal members may be omitted. In this case, a metal surface seal by the oil-tight clearance is utilized. It is essential to minimize the sliding resistance while the piston 27 is properly sealed and to perform proper and smooth rotation of the respective components.

The present invention is not limited to the particular embodiment described above. Shapes and structures of the respective components may be changed and modified within the spirit and scope of the invention. In the above embodiment, the balls 23 are mounted on the output shaft 11 and the reaction force reception portion 25 with the engaging recesses 24 is formed on the input shaft 10. However, the structures of the input and output shafts 10 and 11 may be reversed.

Figures 4, 5:
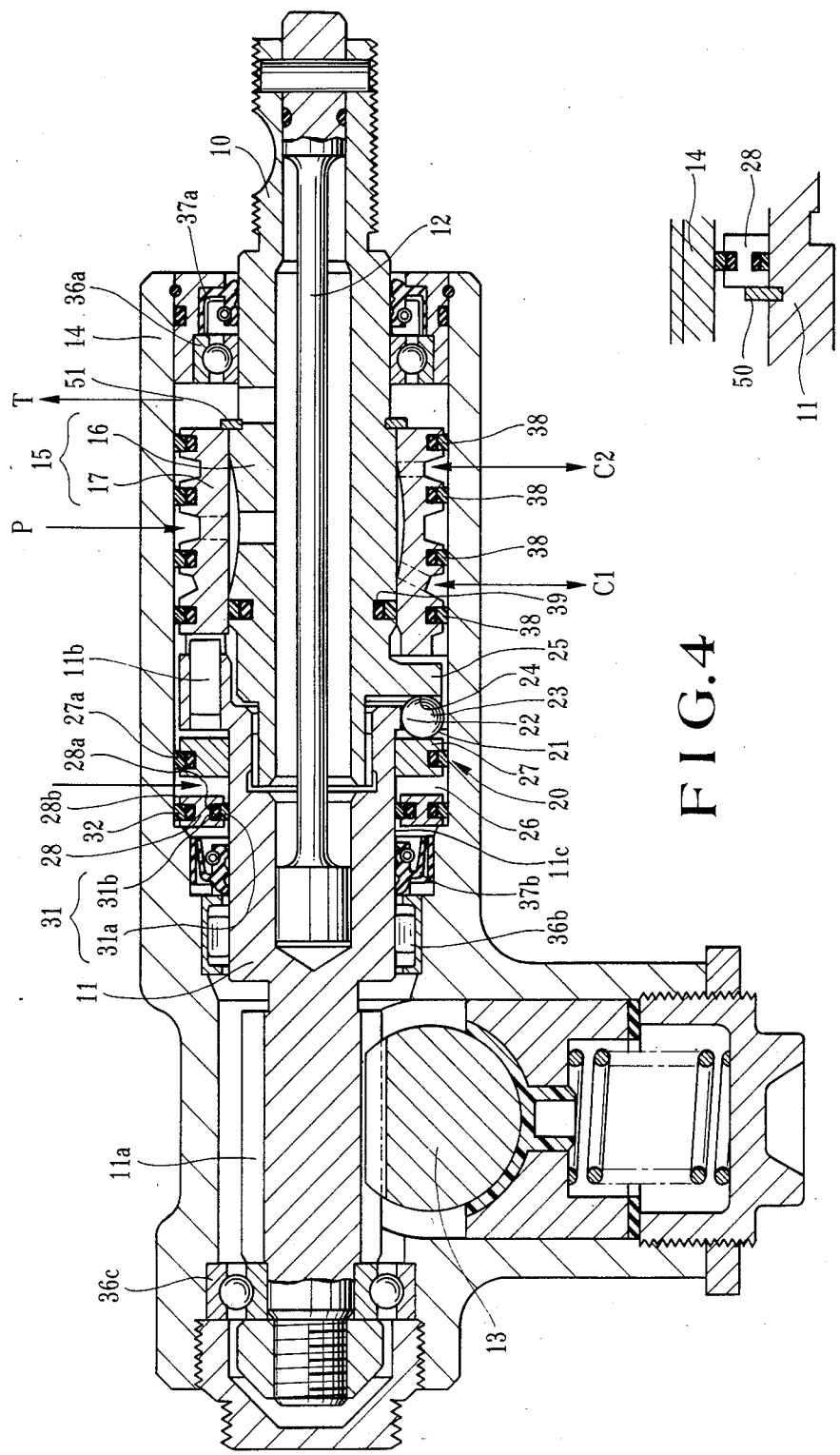
FIG. 4 is a sectional view of a hydraulic reaction force apparatus for a power steering system according to another embodiment of the present invention.
FIG. 5 is an enlarged detail view showing a snap ring stop member.

FIG. 4 shows another embodiment of the present invention. The same reference numerals as in FIGS. 1 to 3B denote the same parts in FIG. 4. Referring to FIG. 4, according to the characteristic feature of this embodiment, a seal portion defining one end (left end) of a hydraulic reaction force chamber formed between the outer surface of an output shaft 11 and an inner wall surface of a body 14 comprises an annular seal member 28 fitted on the outer surface of a small-diameter portion 11c of the output shaft 11 in a body 14, and inner and outer seal rings 31 and 32 fitted in and on the inner and outer annular grooves 28a and 28b and set such that the inner sliding resistance is smaller than the outer sliding resistance. In this embodiment, the inner seal ring 31 comprises a laminated body consisting of a plastic ring 31a such as a Teflon ring and an O-ring 31b fitted in the annular groove 28a. The outer seal ring 32 comprises an O-ring.

With the above structure, the outer surface of the output shaft 11 as a rotating side is in contact with the inner wall surface of the body 14 as a stationary side through the annular seal member 28 having the inner and outer seal rings 31 and 32. Since the sliding resistances of the inner and outer seal rings 31 and 32 are determined, as described above, the sliding resistances acting on the input and output shafts 10 and 11 during steering are derived from a portion between the outer surface of the small-diameter portion 11c of the output shaft and the inner seal ring 31. In addition, the sliding portion has a smaller radius from the axis than the inner surface wall of the body 14, and has a smaller sliding length and angular displacement. Therefore, the sliding resistance at the sliding portion can be greatly reduced as compared with the conventional case wherein the sliding resistance is directly sealed between the inner wall surface of the body and the outer surface of the output shaft 11, thereby achieving good steering feeling. When the hydraulic reaction force chamber 26 is set at a high pressure, the sliding resistance at the inner seal ring 31 is increased. However, a rate of increase in sliding resistance can be negligible as compared with the conventional case.

In this embodiment, the annular seal member 28 is eccentrically supported in a floating manner by the elastic force of the O-ring constituting the outer seal ring 32, thereby absorbing lateral movements of the output shaft 11. Such movements have posed a significant sealing problem in the conventional structure. At the same time, the fastening force of the plastic ring 31a of the inner seal ring 31 is decreased, and the ring 31a can be guided toward the output shaft 11, thus achieving low-friction seal.

The left end of the annular seal member 28 is locked by a snap ring 50 arranged on the side of the output shaft 11, as shown in FIG. 5. A force caused by the oil pressure in the hydraulic reaction force chamber 26 and acting on the side of the output shaft 11 can be balanced in the right-and-left direction, and stability of steering can be further improved. The force acting on the output shaft 11 in the right direction is applied to the input and output shafts 11 such that a pressure acting on a step between the small-diameter portion 11c and a large-diameter portion of the output shaft 11 is transmitted to a snap ring 51 for locking the right end of the valve sleeve 17. The force acting on the output shaft 11 in the left direction is given such that the pressure acting on the right end face of the annular seal member 28 is transmitted through a snap ring 50. The right- and left-direction forces are balanced on the output shaft 11. In particular, in the output shaft 11 having the pinion 11a coupled to a helical gear with the rack 13, axial movement is caused to improve operational stability. However, the structure shown in FIG. 1 does not pose any practical problems.

In the hydraulic reaction force apparatus having the structure described above, the annular seal member 28 as the characteristic feature of this embodiment is used to seal the end (the left end) of the reaction force piston 27 opposite to the hydraulic reaction force chamber 26. The same effect as in the first embodiment can be obtained. In the second embodiment, the outer seal ring 32 comprises a laminated body as a combination of the plastic ring and the O-ring in the same manner as in the inner seal ring 31. With this arrangement, the annular seal member 28 is in sliding contact with the inner wall surface of the body 14. Therefore, the sliding resistance between the annular sea member 28 and the outer surface of the small-diameter portion 11c of the output shaft 11 can be reduced as compared with the stationary annular seal member 28 in the previous embodiment.

What is claimed is:
1. A hydraulic reaction force apparatus for a power steering system, comprising:
 an input shaft;
 an output shaft coaxial with said input shaft, said output shaft and said input shaft being rotatable relative to each other;
 a flange formed on one of said input and output shafts;
 said plurality of guide holes axially extending through a flange formed on one of said input and output shafts;
 a corresponding plurality of balls each axially slidable in a different one of said guide holes, respectively;
 a reaction force reception portion formed on the other one of said input and output shafts so as to oppose one major surface of said flange, said reaction force reception portion being adapted to receive said balls;
 a hydraulic reaction force chamber located adjacent the other major surface of said flange which opposes said one major surface thereof; and
 a reaction force piston slidably coaxial with said input and output shafts in said hydraulic reaction force chamber, said reaction force piston being adapted to urge said balls against said reaction force reception portion to generate a restriction force corre- sponding to a reaction force hydraulic pressure between said input and output shafts.

2. An apparatus according to claim 1, wherein said reaction force piston on a ring is axially slidable on an outer surface of said one shaft with said flange.

3. An apparatus according to claim 1, wherein said reaction force piston includes a seal ring means for sealing between a steering body and said one shaft with said flange.

4. An apparatus according to claim 1, wherein said hydraulic reaction force chamber is defined by said reaction force piston and an annular seal member spaced apart therefrom between a steering body and said one shaft with said, flange.

5. An apparatus according to claim 4, wherein a seal ring is disposed between said seal member and said steering body.

6. An apparatus according to claim 4, wherein an oil-tight clearance is formed between said seal member and said one shaft with said flange.

7. An apparatus according to claim 4, wherein said seal member comprises inner and outer seal rings for respectively sealing spaces between said seal member and said steering body and between said seal member and said one shaft with said flange, and at least said inner seal ring being constituted by a plastic ring and an O-ring fitted therein.

8. An apparatus according to claim 1, wherein said reaction force reception portion has a shape to limit circumferential movement of said balls.

* * * * *